Oct. 21, 1969
R. RULLIER ET AL  3,473,988
METHOD FOR EDGE SEALING MULTIPLE PANED GLASS
Filed May 24, 1965  3 Sheets-Sheet 1
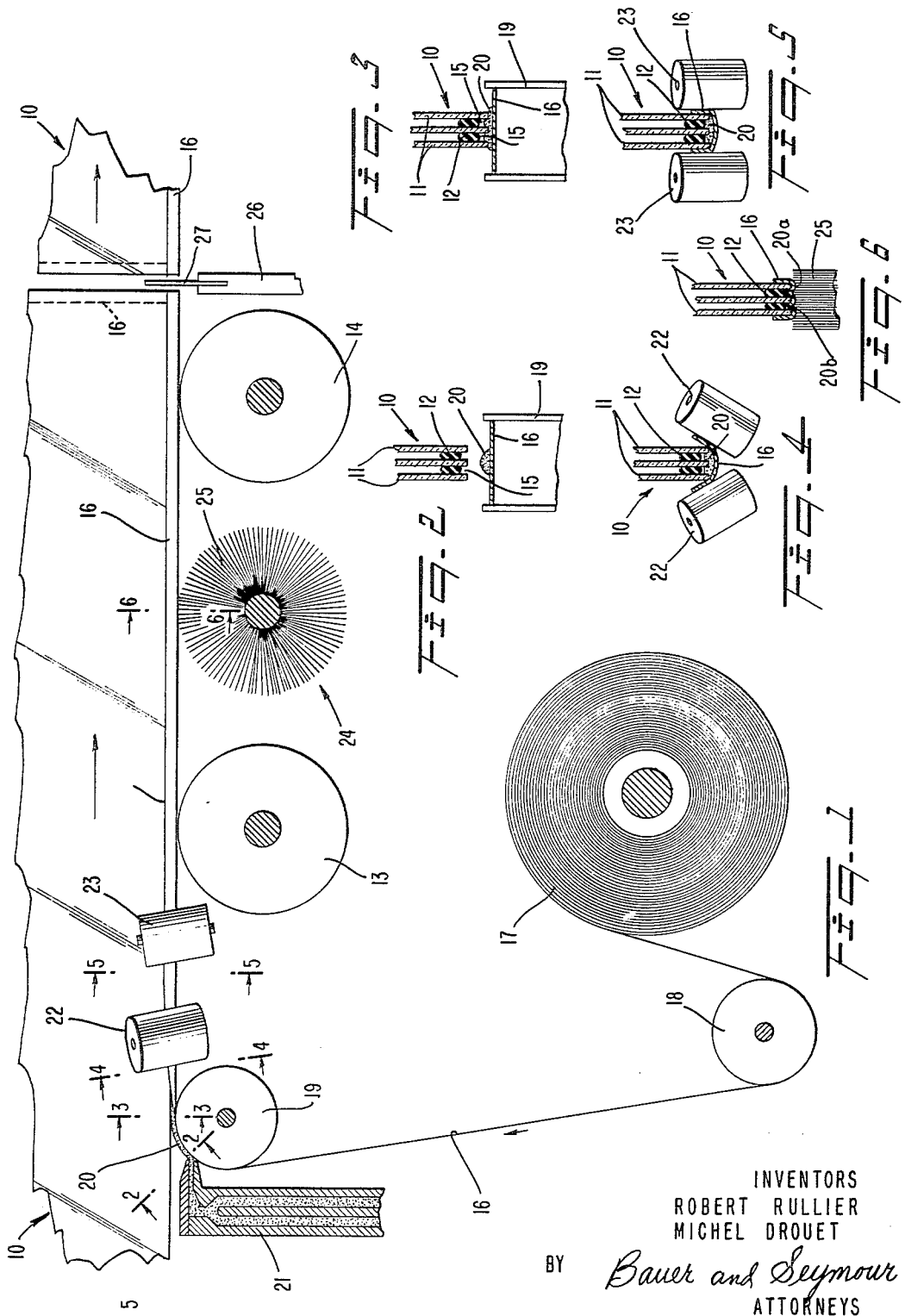
INVENTORS
ROBERT RULLIER
MICHEL DROUET
BY Bauer and Seymour
ATTORNEYS Oct. 21, 1969  R. RULLIER ET AL  3,473,988
METHOD FOR EDGE SEALING MULTIPLE PANED GLASS
Filed May 24, 1965  3 Sheets-Sheet 2
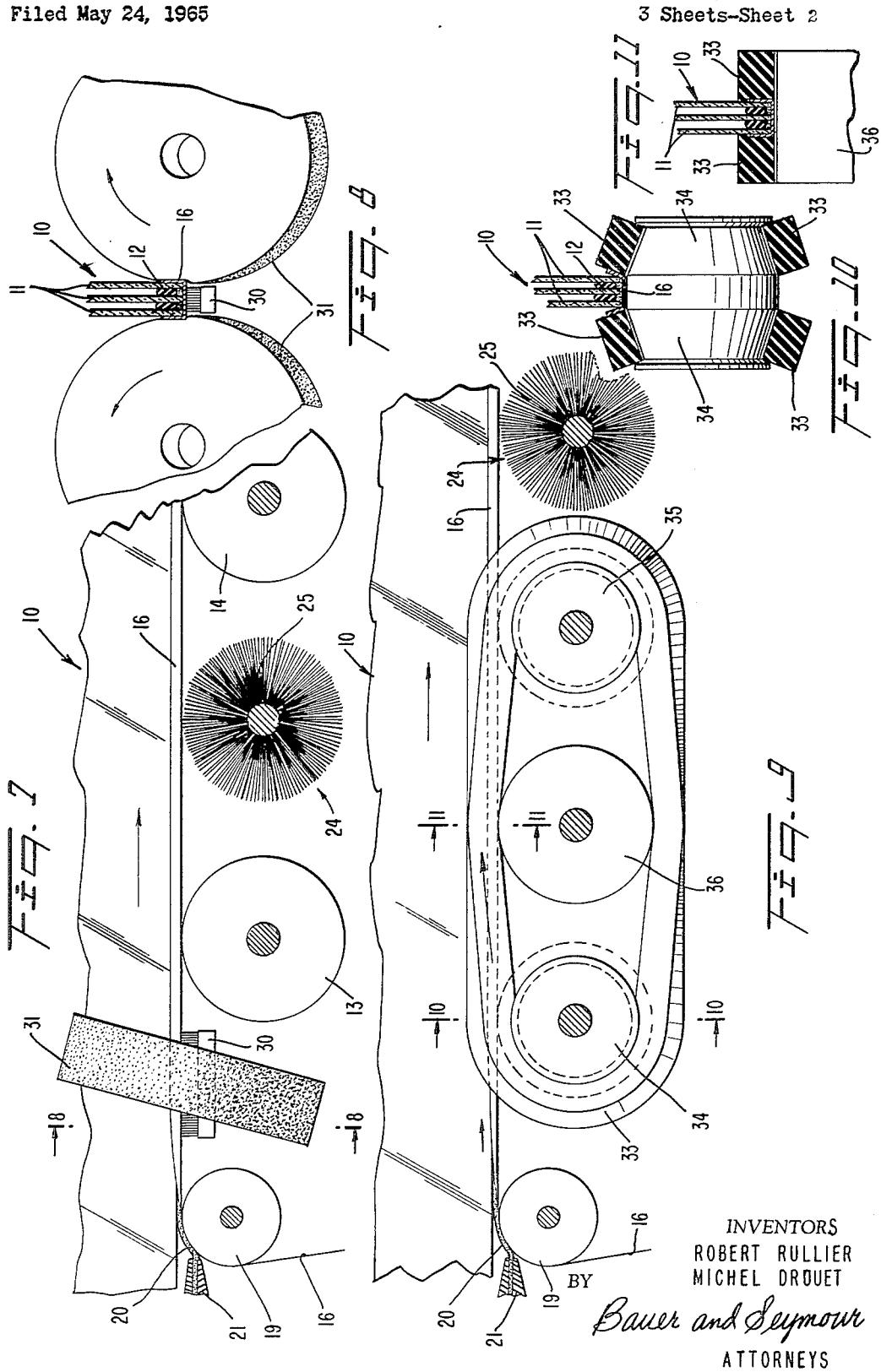
INVENTORS
ROBERT RULLIER
MICHEL DROUET
BY Bauer and Seymour
ATTORNEYS

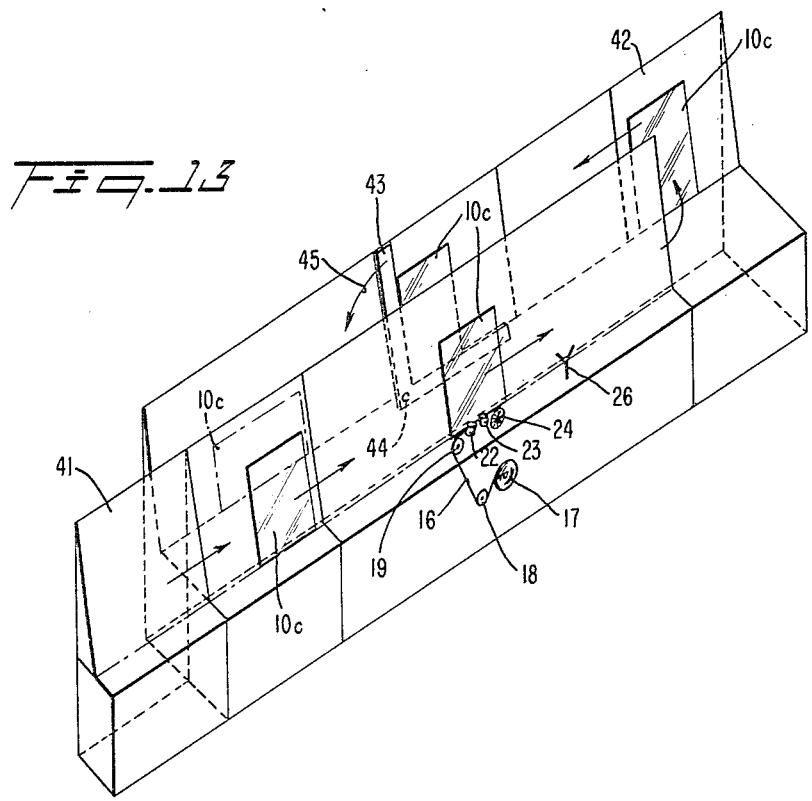
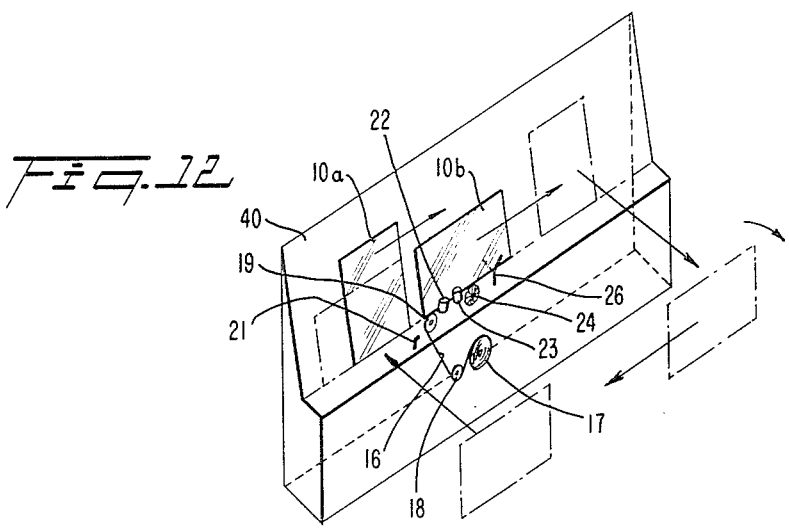

3,473,988
METHOD FOR EDGE SEALING MULTIPLE
PANED GLASS
Robert Rullier, Bois-Colombes, and Michel Drouet,
Chalon-sur-Saone, France, assignors to Compagnie
de Saint-Gobain, Neuilly-sur-Seine, France
Filed May 24, 1965, Ser. No. 457,970
Claims priority, application France, May 25, 1964,
975,704
Int. Cl. C03c 27/10; B31f 1/00
U.S. Cl. 156—107                                1 Claim

ABSTRACT OF THE DISCLOSURE

Method of making multiple paned windows which comprises placing between adjacent parallel glass panes a strip of polyisobutylene generally parallel to the edges of the panes and set in from said edges to provide a space along and between the edges of the panes to provide a groove, placing in the groove a sufficient amount of silicone elastomer and vulcanizing catalyst to fill the width of the groove and wet the surface of the polyisobutylene strip and adjacent panes, and vulcanizing said elastomer in situ.

---

The present invention relates to multiple paned glass windows and in particular to an improved seal between the panes of glass of multiple windows and a method and apparatus for making the seal.

The multiple paned glass windows under consideration consist of two or more coextensive parallel panes of glass spaced apart and sealed around the edge to provide an insulating dead air space between the panes. The purpose of such windows is to transmit light while reducing the transmission of heat and noise.

It is a particular problem in the construction of such windows to obtain a tight joint between the panes which forms a good seal of the interior of the window to keep humidity out. If humidity gets into the space between the panes it results in condensation which not only interferes with the visibility through the window, but attacks the glass and produces blemishes and indelible stains.

To avoid the penetration of humidity, joints between the panes have been made with resin plastic. One of the most satisfactory and well-known resin plastics which has been used is polyisobutylene. It is usually loaded to some extent with carbon black as a filler or extender and has certain characteristics which render it desirable for the purpose. The desirable characteristics of polyisobutylene for window joints are that it is impermeable and inert with respect to water and water vapor and its plasticity can be adjusted considerably as desired for particular conditions of use. On the other hand, it has defects which detract from its usefulness, namely, it has little adherence to glass, it presents a substantial cold flowing (even when heavily loaded with carbon black) and it has no elasticity.

Due to these latter defects the window joints made with polyisobutylene tend to open up and permit humidity to enter thereby defeating the benefit of the impermeability of the material.

An object of the present invention is to provide a method for sealing the edges of the panes of glass of a multiple paned window with a seal making use of the desirable characteristics of polyisobutylene but overcoming the defects of polyisobutylene. Thus, the invention provides a sealed joint which is impermeable and inert with respect to water and water vapor and which in addition has adherence for the glass and elasticity so that the joint will not open up to admit humidity.

In accordance with the invention, the sealed joint is formed in two parts, an interior part of polyisobutylene and a second, outer part which has the characteristics of elasticity and adherence for glass which the polyisobutylene part lacks. The second, outer part of the joint is made with a silicone elastomer. Silicone elastomers, as is known, are polyorganosiloxanes having the general formula:

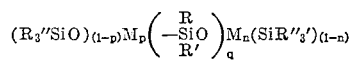

in which:

R, R', R'', R''' are monovalent hydrocarbon radicals,
M is an alkali metal or hydrogen,
$q$ is between 2,000 and 15,000,
$p$ is between 0.02 and 1, and
$n$ is between 0.02 and 1.

By forming a part of the joint of a silicone elastomer, the joint is adhered to the glass and prevents separation of the panes. In addition the silicone elastomer provides rigidity to hold the panes spaced apart.

Silicone elastomers also have the advantage that they are vulcanizable at ambient temperature under the action of humidity in the air, this vulcanizing being accelerated by the inclusion of a vulcanizing catalyst such as a peroxide or an organostannic composition. As an example, the inclusion in the silicone elastomer of a catalyst such as methyl-triacetoxysilane accelerated vulcanizing at ambient temperature by the action of the natural humidity of the air so that a joint in accordance with the invention had hardened and was adhered to the glass after about 12 hours.

The vulcanizing catalyst may be mixed into the silicone gum at the time it is applied to the joint or the silicone gum may already contain the catalyst as in some commercially available formulations.

In the practice of the invention, the silicone elastomer may be loaded to a certain extent with inert fillers in order to reduce the cost without impairing the desirable characteristics. Suitable fillers are silica powder, powdered quartz, oxide of titanium, diatomaceous earth and the like.

In its raw taste, that is, without the inclusion of a filler, silicone elastomer applied in a sealed joint between glass panes in accordance with the invention has an elongation at rupture on the order of 430% and a tensile strength of 70 to 95 kg./cm.² These characteristics can be modified to some extent without impairing the desirable features of the joint by the inclusion of fillers and the following table gives examples of mixtures of silicone gum and various fillers which have adherence, elongation and tensile strength suitable for the practice of the present invention. In this table, ingredients of the mixtures are given in parts by weight.

| | | | | | | | | |
|---|---|---|---|---|---|---|---|---|
| Silicone gum | 60 | 50 | 60 | 50 | 60 | 50 | 40 | 40 |
| Silica of combustion | 5 | 4 | 5 | 4 | 5 | 4 | 3.3 | 3.3 |
| Crushed silica | | | | | | | | 56.7 |
| "Celite" 270 mineral filler | 35 | 43 | | | | | | |
| "Celite" Super Floss mineral filler | | | 35 | 46 | | | | |
| Quartz powder | | | | | 35 | 46 | 56.7 | |
| Adherence, kg./cm. | 1.6 | 1.6 | 1.7 | | 3.6 | 1.7 | 1.16 | 1.61 |
| Elongation, percent | 120 | 87 | 140 | 70 | 260 | 180 | 117.5 | 113 |
| Tensile strength, kg./cm.² | 10.2 | 17.5 | 29.8 | 16.8 | 24.2 | 24.9 | 27.9 | 13.4 |

In accordance with the invention the multiple panel window is formed by stacking two or three or more coextensive panes of glass on top of each other in parallel relation with a strip of polyisobutylene at the edges between each two adjacent panes. The polyisobutylene strip holds the panes spaced apart and is set in from the edge to form a groove or grooves between adjacent panes around the edges of the window and the silicone elastomer is packed into the grooves. Sufficient silicone elastomer is placed in the grooves at least to fill the width of each groove between adjacent panes, and it is preferably packed in against the polyisobutylene strip so as to adhere to the polyisobutylene strip as well as to the glass when it is vulcanized. Then the edges of the window are preferably covered by a protective adhesive tape which covers the edge.

In accordance with the method of the invention the silicone elastomer is applied to grooves, which are provided at the edges of a two or three or more pane multiple window by setting an interior strip of polyisobutylene in from the edges as described above, by laying a bead of the silicone unvulcanized elastomer on a strip of adhesive tape and pressing the tape against the edges of the window so that the silicone elastomer is forced into the grooves.

Following are two illustrative examples of the formation of sealed joints in accordance with the invention. In the examples the windows were made up of three coextensive panes of glass spaced apart about 1 mm. in parallel relation with strips of polyisobutylene set in about 1 to 2 mm. from the edges of adjacent panes.

Example I

The grooves between adjacent panes formed by setting strips of polyisobutylene in from the edges were filled with a silicone elastomer having a vulcanizing catalyst included therein and sold in commerce under the designation "XCAF" by Société Rhone Poulenc. This elastomer and catalyst mixture is suitably forced into the grooves with a spatula or with a Tereson pistol type injector gun having a die with two 1.5 mm. orifices.

After the grooves were filled a protective adhesive tape was applied over the edges of the window.

Example II

In this example the procedure was the same as in Example I but in this case the silicone elastomer which was used consisted of a mixture made up of:

500 parts by weight of silicone gum sold under the designation "700RTV" by Société Industrielle des Silicones 422.5 parts of quartz powder of a size to pass through a 300 mesh screen 222.5 parts "CELITE" Super Floss mineral filler (diatomaceous earth)

This mixture was mixed for about 30 minutes in a Kustner type mixer, after which a catalyst sold under the designation "XI 78" by Société Industrielle des Silicones was incorporated in the mixture.

The proportion of the catalyst which is incorporated in the silicone elastomer may be varied as desired to speed up the vulcanizing. In general, 8 to 14% by weight of catalyst gives good results. After the catalyst has been introduced into the silicone elastomer the mixture is mixed for a few more minutes.

The plasticity of the mixture of silicone elastomer and catalyst may be adjusted as required for the particular manner in which it is to be inserted in the grooves. In particular, if the silicone elastomer is first laid on an adhesive tape to be forced into the groove by pressing the tape to the edges of the window, the plasticity would suitably be between 300 and 360° as measured by a "PROLABO" durometer. The ability of the mixture to flow as measured by the Flow Test method is suitably between 40 and 60.

The mixture thus prepared has a satisfactory fluidity to be extruded in a bead of paste on the adhesive tape and to be forced into the grooves when the tape is pressed to the edges of the window.

The completed window having a sealed joint prepared and covered with the protective adhesive tape, as described above, is set aside for about 12 hours at ambient temperature for the vulcanizing and hardening of the silicone elastomer. Thereafter the window can be handled without special precautions.

In practice, a two part joint having its exterior part formed of vulcanized silicone elastomer, i.e., silicone rubber, in accordance with the invention provides a tightly sealed rugged joint which is simple to produce. The fluidity of the elastomer before vulcanizing allows it to be inserted easily into the groove provided for it, the nature of the elastomer causes it to wet the glass and the polyisobutylene forming the sides and bottom of the groove respectively, and the elastomer vulcanizes and hardens in situ without having to provide special conditions of temperature and humidity.

The simplicity of the method of making the joint of this invention renders it particularly adapted to be fabricated with automatic or semi-automatic apparatus in accordance with the invention.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views, FIGURE 1 is a side elevation, partly schematic and partly in section of one embodiment of apparatus for fabricating a sealed joint with an adhesive tape in accordance with the invention;

FIGURES 2, 3, 4, 5 and 6 are views along the lines 2–2, 3–3, 4–4, 5–5 and 6–6 respectively of FIGURE 1;

FIGURE 7 is a side elevation, partly schematic and partly in section, of a second embodiment of apparatus for fabricating a joint in accordance with the invention;

FIGURE 8 is a view along the line 8–8 of FIGURE 7;

FIGURE 9 is a side elevation, partly schematic and partly in section of a third embodiment of apparatus for fabricating a joint in accordance with the invention;

FIGURE 10 is a section along the line 10–10 of FIGURE 9;

FIGURE 11 is a section along the line 11–11 of FIGURE 9;

FIGURE 12 is a perspective view showing schematically an installation utilizing apparatus of FIGURE 1 for fabricating sealed joints of the invention semi-automatically along the four edges of a multiple paned window; and FIGURE 13 is a perspective view showing schematically an installation utilizing apparatus of FIGURE 1 for automatically fabricating the joints along the four edges of a multiple paned window.

Looking at FIGURES 1–6, a multiple paned window 10 consisting of three coextensive panes of glass 11, which are spaced apart in parallel relation by strips 12 of polyisobutylene between adjacent panes, are supported on support rollers 13 and 14 and conveyed to the right thereby as indicated by the arrows. As seen in FIGURES 2–6 the strips 12 are set in from the edges of adjacent panes so that grooves 15 are formed between adjacent panes around the edges of the window, the grooves being formed by the polyisobutylene strips 12 at the bottom and the glass panes 11 at the sides.

A supply of adhesive tape 16 that is wider than the edge of the window is carried on a spool 17 and passes around a guide roller 18 and around a pressure roller 19 which carries the tape into contact with the edge of the window. The end of the tape 16 is initially threaded over the rollers 18 and 19 and pressed into adhesive contact with the edge of a window 10 supported on the rollers 13 and 14. Thereafter tape 16 is drawn off the spool 17 and continuously feeds over the pressure roller 19 into contact with the window edge by movement of the window as it is conveyed by the rollers 13 and 14. The window 10 may be moved over these rollers 13 and 14 by driving one or both of the rollers or by pulling the window over the rollers.

As the tape 16 moves up to the crest of pressure roller 19 adjacent the edge of the window 10, a continuous bead 20 of silicone elastomer is laid on the tape by an extruder 21. As the tape moves over the crest of the roller 19 the elastomer of the bead 10 is pressed into the grooves 15 as seen in FIGURE 3.

Beyond the pressure roller 19 in the direction of movement of the window are two pairs of rollers 22 and 23 which fold the outwardly extending edge portions of the tape 16 up and press them against the sides of the window. As shown in FIGURE 4, the first pair of rollers 22, which are adjacent the edge of the window at opposite sides of the window respectively, are mounted with their axes oblique to the plane of the window so as to form a trough which folds the edge portions of the tap 16 part way up. The second pair of rollers 23 are similarly at opposite sides of the window and, as seen in FIGURE 5, their axes are parallel to the plane of the window at right angles to the direction of movement of the window with their circumferential surfaces closely adjacent to the sides of the window so as to press the edge portions of the tape 16 into adhesive contact with the sides of the window.

Beyond the rollers 23, a rotary brush 24 is arranged below the edge of the window with its axis at right angles to the plane of the window and with its peripheral bristles 25 pressing against the tape 16 so as to press the tape firmly against the edge of the window and squeeze the silicone elastomer of the bead 20 all the way into the grooves 15 as illustrated at 20a and 20b in FIGURE 6.

Beyond the support roller 14 is a cutting device 26 having a blade 27 connected to move up and cut the tape 16 at the end of the trailing edge of a window 10 which has been conveyed beyond the support roller by suitable support and conveying means not shown.

The embodiments of apparatus shown in FIGURES 7 and 9 are generally similar in structure and operation to the embodiment of apparatus described above with reference to FIGURE 1 and in all the figures like numerals refer to like elements. The difference between the three variations of apparatus shown in FIGURES 1, 7 and 9 is in the means for folding the edge portions of the tape 16 up to press and adhere them to the sides of the window 10.

In the embodiment of FIGURE 7 the means to fold the edge portions of the tape 16 is provided by a stationary brush 30 in contact with the edge of window 10 and a pair of rotary brushes 31 which are tangent to the edge of the window at opposite sides thereof respectively and which are adjacent to the stationary brush 30. The rotary brushes 31 are canted with their axes generally parallel to the plane of the window but directed at an angle away from the edge of the window in the direction of movement of the window. The stationary brush 30 is fixed below the edge of the window and in contact therewith so as to press the tape 16 against the edge of the window as the rotary brushes 31, rotating in the direction of the arrows in FIGURE 8, brush the edge portions of the tape 16 upward against the sides of the window 10.

In the embodiment of FIGURE 9, the means to fold edge portions of the tape 16 against the sides of the window 10 comprises a pair of endless belts 33 spaced apart in parallel relation to be at opposite sides of a window 10 moving through the apparatus and adjacent the sides of the window. The belts 33 are mounted on two pairs of truncated conical rollers 34 and 35 which are spaced apart in the direction of movement of the window with a pair of support rollers 36 between them. As seen in FIGURES 10 and 11, the belts 33 are thick and rectangular in cross section. The conical rollers of the two pairs 34 and 35 are respectively at opposite sides of the window 10 with the broad base portion of conical roller toward the window. The support rollers 36 which are in line with and between the conical rollers 34 and 35 have cylindrical peripheral surfaces at right angles to the plane of the window. At each side of the window a belt 33 is carried around one of the conical rollers 34, one of the support rollers 36 and one of the conical rollers 35 and the rollers are mounted so that the portion of the belt 33 which travels over the tops of the rollers travel in the direction of movement of the window 10 and adjacent to the side of the window at the edge to which the tape 16 is applied. Thus, at each side of the window the upper part of belt 33 is canted away from the edge of the window as it passes over conical roller 34 and partially folds the edge portions of the tape 16 up as seen in FIGURE 10. Then as the belt 33 moves over the top of the support roller 36 it levels out so that its side toward the window swings to a position at right angles to the edge of the window and presses the edge portion of the tape 16 against the side of the window as shown in FIGURE 11. Thereafter the top part of belt 33 swings away from the side of the window as it passes over the conical roller 35.

To move the belts 33, one of the pairs of conical rollers 34 or 35 are driven by conventional drive means not shown. The belts 33 are suitably driven at about the same speed as the window 10 is conveyed by the support rollers 13 and 14 on which a window 10 is supported and conveyed in each of the embodiments of apparatus shown in FIGURES 1, 7 and 9.

FIGURE 12 illustrates an installation utilizing apparatus of FIGURE 1 for semi-automatically fabricating sealed joints in accordance with the invention at successive edges around the periphery of a multiple paned window 10. As indicated, a window 10a is set in one edgewise position against a support wall 40 at the head of the installation at the left end of the wall 40. If is carried at constant speed by suitable driven support rollers past the extruder 21 and over pressure roller 19, at which point the end of tape 16 is manually pressed and adhered to the lower edge of the window. Then the continued movement of the window 10a to the right, as indicated by the arrows and dot and dash outline of the window, causes the tape 16 having the bead 20 of silicone elastomer thereon to be drawn into contact with the edge over roller 19 so that the elastomer is forced into the grooves 15 as described with reference to FIGURE 1. The edge portions of the tape are folded up and pressed against the sides of the window by the rollers 22 and 23, the tape 16 is pressed against the edge of the window by the rotary brush 24, and then when the tail end of the window passes over the cutting device 26 the tape 16 is cut. The window is then removed, turned to another edgewise position and passed through the new edgewise position as indicated by the dot and dash outlines, arrows and full line position of window 10b. The window is passed through the installation four times in four different edgewise positions to fabricate the sealed joint of the invention along all four peripheral edges of the window.

FIGURE 13 illustrates schematically an installation for automatically fabricating the sealed joint in accordance with the invention along the four peripheral edges of a multiple paned window. The window 10c is started from the left starting point in one edgewise position against a support wall 41 and is conveyed to the right over apparatus to form the sealed and taped joint as described with reference to FIGURE 12. At the right end of the installation the window 10c is carried back to a second support wall 42 which is parallel to and behind the support wall 41. The window is conveyed to the left along support wall 42 until it engages an L-shaped frame 43, which is pivoted at the corner as indicated at 44. The frame 43 cradles the window and pivots in the direction of arrow 45 to turn the window to a new edgewise position in which it is conveyed off the L frame 43 and to the left end of the support wall 42, at which point the window is moved up to the front support wall 41 and conveyed over the joint forming apparatus in the new position. The window is left on the installation until it has passed over the joint forming apparatus four times in successive edgewise positions to form the joint on the four peripheral edges of the window.

The sealed joint in accordance with the present invention having and interior part of polyisobutylene and an exterior part of silicone elastomer has a unique combination of advantages. The polyisobutylene at the interior of the joint renders the joint impermeable to water and water vapor and the exterior part of silicone elastomer holds the adjacent panes in position so that the joint does not separate from the polyisobutylene or squeeze the polyisobutylene which could crack the polyisobutylene strip.

The silicone elastomer is simple to apply to the joint in accordance with the invention since it is in plastic condition initially and is vulcanized in situ. When vulcanized in situ, the silicone elastomer adheres to the glass and to the polyisobutylene to assure a tight joint. Moreover, it is elastic and resists crushing or tearing so that it keeps the joint tight and provides a good service life under conditions of use.

It has been proposed to use rigid U-shaped frames for the joints of multiple paned windows to prevent collapsing or separation of the joints, but the use of a silicone elastomer in accordance with the invention keeps the joints from collapsing or separating at least equally as well as a rigid frame and in addition to other unique advantages such as elasticity, it is simpler to apply to the joint than a rigid frame.

Joints in accordance with the present invention have been tested under simulated conditions of use in comparison with joints made with polyisobutylene alone and silicone elastomer alone. In the test the three types of joints were each subjected to similar repetitive cycles of high humidity, temperature change and wind pressure until condensation formed in the interior of the window. The results of this test are as follows:

| Nature of point: | No. of cycles before condensation |
|---|---|
| Polyisobutylene filled with 40% carbon black | 5–10 |
| Silicone elastomer | 15 |
| Joint of the invention having an interior part of polyisobutylene and an exterior part of silicone elastomer | 200 |

What is claimed is:
1. A method of making multiple paned windows comprising arranging at least two coextensive panes of glass in adjacent parallel relation and spacing them apart by placing between adjacent panes a strip of polyisobutylene, said strip being placed generally parallel to the edges of the panes and set in from said edges to provide a space along the edges of the window between the edges of adjacent panes and the strip, placing in said groove a sufficient amount of a plastic mixture comprising a silicone elastomer and a vulcanizing catalyst therefor to fill the width of the groove and wet the surface of the polyisobutylene strip and adjacent panes in said groove, and vulcanizing said elastomer in situ.

References Cited
UNITED STATES PATENTS

| | | | |
|---|---|---|---|
| 2,089,991 | 8/1937 | Boicey | 156—107 |
| 2,838,810 | 6/1958 | Englehart et al. | 156—107 |
| 3,050,490 | 8/1962 | Nitzsche et al. | 260—37 |
| 3,061,575 | 10/1962 | Russell | 260—37 |
| 3,184,427 | 5/1965 | Russell | 260—37 |

WILLIAM J. VAN BALEN, Primary Examiner

R. F. BURNETT, Assistant Examiner

U.S. Cl. X.R.

52—309, 616; 156—109, 461; 161—44, 45